Aug. 7, 1934.  C. L. BAUSCH  1,969,637
OPHTHALMIC MOUNTING
Filed Jan. 30, 1932
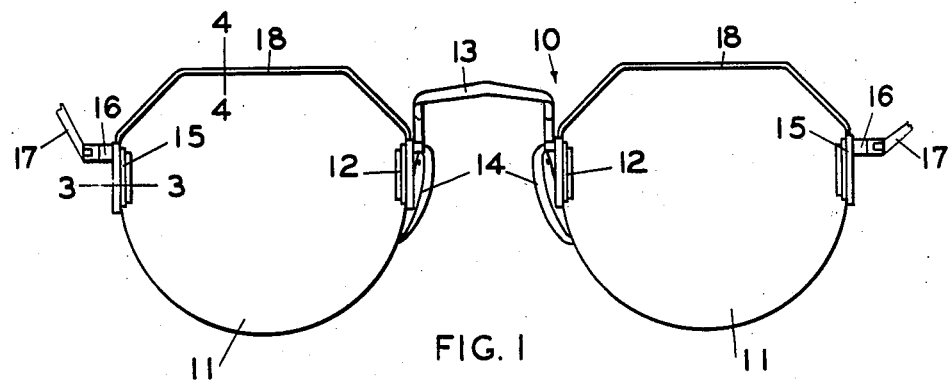
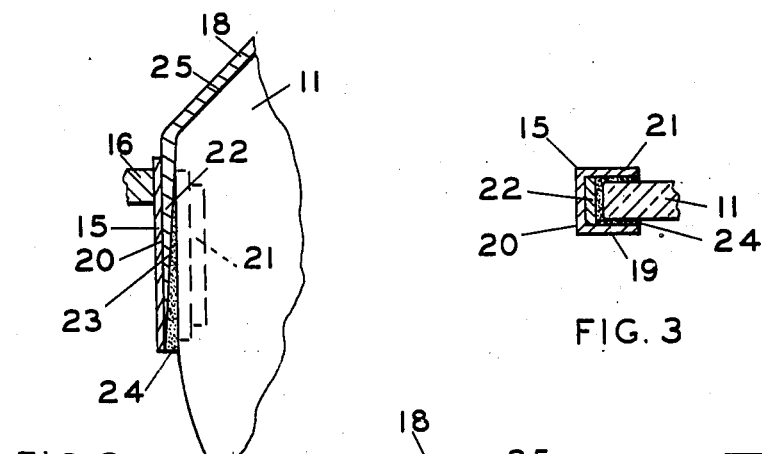
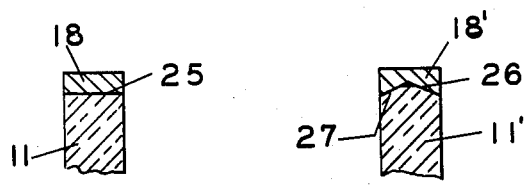
CARL L. BAUSCH
INVENTOR
BY *J. A. Ellestad*
ATTORNEY Patented Aug. 7, 1934

1,969,637

UNITED STATES PATENT OFFICE 1,969,637

OPHTHALMIC MOUNTING

Carl L. Bausch, Rochester, N. Y., assignor to Bausch & Lomb Optical Company, Rochester, N. Y., a corporation of New York Application January 30, 1932, Serial No. 589,916

6 Claims. (Cl. 88—47)

This invention relates to ophthalmic mountings and more particularly it has reference to an improved means for mounting and holding lenses.

At the present time, lenses are quite generally secured to rimless mountings by the use of screws which pass through holes in the lenses, all as is well known to those skilled in the art. Such a method of securing lenses is not satisfactory because the conditions of use are such that the screws soon get loose and the lenses frequently break because of the weakening caused by drilling a hole in the lens. To overcome these difficulties, it has been proposed to secure the lenses to rimless mountings by means of cementitious substances and devices of various kinds. In case one of the lens straps gets loose, it is practically impossible to wear the spectacles since a loosened strap of this type would be very apt to become entirely disengaged from the lens. With a loosened screw strap, the spectacles could, of course, still be worn without danger of the strap coming entirely off the lens.

It has also been proposed to provide rimless spectacles with a rim which extends only partially around the periphery of the lens so that the end piece strap and bridge strap are connected by the rim. With such a structure, however, the lens strap has been secured to the lens by means of the usual screw which passes through a hole in the lens. In making up such a mounting it is essential that the edge of the lens be exactly fitted to the rim portion and also that the screw holes in the lens be very accurately located. If the lens is not accurately edged and drilled to fit the rim and straps, the lens will either be loosely mounted or fitted so tightly that undue strains will be put on the lens with the result that the lens will break. In either event, the spectacles will be improperly assembled from a mechanical standpoint and will, furthermore, present an unsightly appearance.

One of the objects of this invention is to provide an improved mounting for lenses. Another object is to provide an improved mounting for spectacles of the semi-rimless type. A further object is to provide a pair of spectacles having cemented lens straps which are connected by a rim. These and other objects and advantages reside in certain novel features of construction, arrangement and combination of parts as will hereinafter be more fully described and pointed out in the appended claims.

Referring to the drawing:

Fig. 1 is a front view of a pair of spectacles embodying my invention.

Fig. 2 is an enlarged fragmentary view of same with parts in section.

Fig. 3 is a sectional view taken on line 3—3 of Fig. 1.

Fig. 4 is a view taken on line 4—4 of Fig. 1.

Fig. 5 shows a modified rim structure.

A preferred embodiment of my invention is illustrated in the drawing wherein 10 indicates, generally, a pair of spectacles comprising the two lenses 11 having the lens straps 12 to which a bridge 13 is secured. Suitable nose guards or pads 14 are also secured to straps 12. Mounted on the outer edges of lenses 11 are the lens straps 15 to which are attached the usual end pieces 16 which pivotally carry the temples 17. Extending along the periphery at the top of the lens is the rim 18 which has its two ends secured, respectively, to straps 12 and 15.

As shown on the drawing, the strap 15 comprises a single piece of metal formed in a substantially U-shape so as to provide the front, side and rear portions 19, 20 and 21, respectively. The end 22 of the rim 18 extends downwardly into the strap 15 and is soldered to the side portion 20 of the strap. The end 22 is preferably tapered as shown at 23 in Fig. 2 so as to permit the rim 18 and strap 15 to be snugly fitted to the edge of the lens 11. Any suitable cement, indicated at 24, can be used for securely holding the strap 15 to the lens. The cement covers relatively large areas on the front and rear surfaces of the lens so that the front and rear portions of the strap are securely fastened to the lens. A small amount of cement will be lodged between the edge of the lens and the side portion of the strap, as shown in Fig. 2, but it is preferable that at least a portion of the end 22 of rim 18 be in contact with the edge of the lens. This insures a rigid and definite location for the strap on the lens and the cement on the two faces of the lens serves to hold the strap firmly in place. It will be understood, of course, that the structure of strap 12 is the same as that of strap 15.

In Fig. 4 I have shown the rim 18 provided with a flat inner surface 25 which contacts with the flat edge of the lens 11. Instead of this structure I may use the modified structure, shown in Fig. 5, which embodies a rim 18' having an internal groove 26 into which the beveled edge 27 of lens 11' is adapted to fit. Although I have shown the rim 18 positioned on top of the lens, it is obvious that the rim could be applied to the under side of the lens. The rim can, of course, be applied to lenses of various shapes and sizes.

From the foregoing, it will be apparent that I am able to attain the objects of my invention and provide an improved type of semi-rimless mounting. No screws are used for attaching the lenses and hence the lenses are not weakened by screw holes. If one strap accidentally gets loose, the spectacles could still be safely worn in an emergency since both of the straps are connected by a rim. The lens is protected by the rim although the rim only partially surrounds the lens and hence is not conspicuous. Such a semi-rimless mounting can be readily assembled without requiring extreme accuracy in edging the lens and hence it is adapted for practical use and sale by dispensing opticians. The semi-rimless mounting of the prior art required accurately located screw holes and extreme accuracy in edging the lens but my structure eliminates these requirements. Various modifications can obviously be made without departing from the spirit of my invention.

I claim:

1. An ophthalmic mounting comprising two spaced lens straps adapted to be secured to opposite edges of an imperforate lens and a rim portion connecting said straps, each of said straps having front and rear imperforate portions cemented, respectively, on the front and rear surfaces of the lens.

2. An ophthalmic mounting having in combination two spaced lens straps secured to opposite edges of a lens, a rim connecting said straps and engaging the edge of the lens, said straps being secured to said lens by means of a cementitious substance.

3. An ophthalmic mounting having in combination two lens straps mounted on opposite edges of a lens, each of said straps having front and rear imperforate portions, each of said straps being secured to the lens by means of a cementitious substance between said imperforate portions and the front and rear surfaces of the lens and a rim portion connecting said straps, said rim portion extending partially around the edge of the lens.

4. In an ophthalmic mounting, a lens strap having a side portion, said strap being secured to the edge of a lens by a cementitious substance, a rim extending along the edge of the lens, the end of said rim being secured to the inner face of the side portion of said strap, said end having a tapered portion whereby part of said end contacts with the edge of said lens and another part is held out of contact with the edge of the lens by a layer of cementitious substance.

5. An ophthalmic mounting comprising spaced lens straps positioned on opposite sides of a lens, a rim connecting said straps and engaging the edge of the lens, said straps being secured to the lens by a substance which is fluid when applied to the parts of the lens and straps and subsequently becomes relatively hard and firm so as to hold the straps securely on the lens.

6. An ophthalmic mounting comprising two lens straps secured on opposite edges of a lens, said straps being connected by a rim which partially surrounds the lens and engages the edge thereof, one of said straps being secured to the lens by a substance which is fluid when applied to the parts of the strap and lens subsequently becomes relatively hard and firm so as to hold the strap on the lens.

CARL L. BAUSCH.